US012603965B2

(12) United States Patent

Nodsu

(10) Patent No.: US 12,603,965 B2

(45) Date of Patent: Apr. 14, 2026

(54) PRINTING DEVICE SETTING EXPANDED REGION AND GENERATING PATCH CHART PRINT DATA BASED ON PIXELS IN EXPANDED REGION

(71) Applicant: BROTHER KOGYO KABUSHIKI KAISHA, Nagoya (JP)

(72) Inventor: Tomohiro Nodsu, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 411 days.

(21) Appl. No.: 18/338,560

(22) Filed: Jun. 21, 2023

(65) Prior Publication Data

US 2023/0421714 A1 Dec. 28, 2023

(30) Foreign Application Priority Data

Jun. 28, 2022 (JP) ................................. 2022-103363

(51) Int. Cl.
   *H04N 1/60* (2006.01)
   *H04N 1/00* (2006.01)
(52) U.S. Cl.
   CPC ............. *H04N 1/60* (2013.01); *H04N 1/0044* (2013.01); *H04N 1/00779* (2013.01)
(58) Field of Classification Search
   CPC ..... H04N 1/60; H04N 1/0044; H04N 1/00779
   See application file for complete search history.

(56) References Cited

U.S. PATENT DOCUMENTS

| | | | |
|---|---|---|---|
| 6,441,923 B1 * | 8/2002 | Balasubramanian | ........................ H04N 1/6033 358/3.23 |
| 6,909,522 B1 * | 6/2005 | Nishida | ................ H04N 1/3871 358/1.11 |
| 7,202,973 B2 * | 4/2007 | Yamamoto | .......... B41F 33/0036 358/1.9 |
| 7,333,238 B2 * | 2/2008 | Anson | .................... G06K 15/02 358/1.9 |
| 2003/0030828 A1 * | 2/2003 | Soler | ...................... H04N 1/626 358/1.9 |

(Continued)

FOREIGN PATENT DOCUMENTS

| | | |
|---|---|---|
| JP | 2003-204445 A | 7/2003 |
| JP | 2010-157920 A | 7/2010 |

*Primary Examiner* — Akwasi M Sarpong
*Assistant Examiner* — Michael L Burleson
(74) *Attorney, Agent, or Firm* — Scully, Scott, Murphy & Presser, P.C.

(57) ABSTRACT

In a printing device, a print head performs printing based on image data. The image data represents an original image including a plurality of original pixels. The controller displays a preview image based on the image data. In the preview image, each preview-image pixel corresponds to one of the plurality of original pixels and has a color based on a color of the corresponding original pixel. The controller receives information on a preview-image pixel specified by a user. The controller sets an expanded region in the original image on the basis of a printing resolution. The expanded region includes original pixels having an original pixel corresponding to the specified preview pixel. The controller generates patch chart print data based on color values of original pixels in the expanded region. The controller controls the print head to print the patch chart image.

12 Claims, 11 Drawing Sheets

(56)　　　　　References Cited

U.S. PATENT DOCUMENTS

| | | | | |
|---|---|---|---|---|
| 2004/0190017 | A1* | 9/2004 | Anson | G06K 15/02 |
| | | | | 358/1.9 |
| 2005/0001913 | A1* | 1/2005 | Hoshuyama | G06T 5/70 |
| | | | | 348/272 |
| 2005/0270305 | A1* | 12/2005 | Rasmussen | G06T 17/05 |
| | | | | 345/613 |
| 2007/0280710 | A1* | 12/2007 | Tainer | B41J 2/0458 |
| | | | | 347/11 |
| 2008/0240598 | A1* | 10/2008 | Hasegawa | G06T 5/92 |
| | | | | 382/254 |
| 2014/0354724 | A1* | 12/2014 | Shimomura | B41J 2/07 |
| | | | | 347/14 |
| 2015/0172479 | A1* | 6/2015 | Sano | G07F 17/266 |
| | | | | 358/1.15 |
| 2015/0256695 | A1* | 9/2015 | Showering | G06V 10/987 |
| | | | | 358/505 |
| 2017/0013174 | A1* | 1/2017 | Morovic | H04N 1/6008 |
| 2017/0310854 | A1* | 10/2017 | Yamaguchi | H04N 1/6008 |
| 2019/0129605 | A1* | 5/2019 | Schultz | G06Q 30/0643 |
| 2021/0286989 | A1* | 9/2021 | Zhong | G06N 20/20 |
| 2022/0174184 | A1* | 6/2022 | Hayashi | H04N 1/6008 |

* cited by examiner

FIG. 5
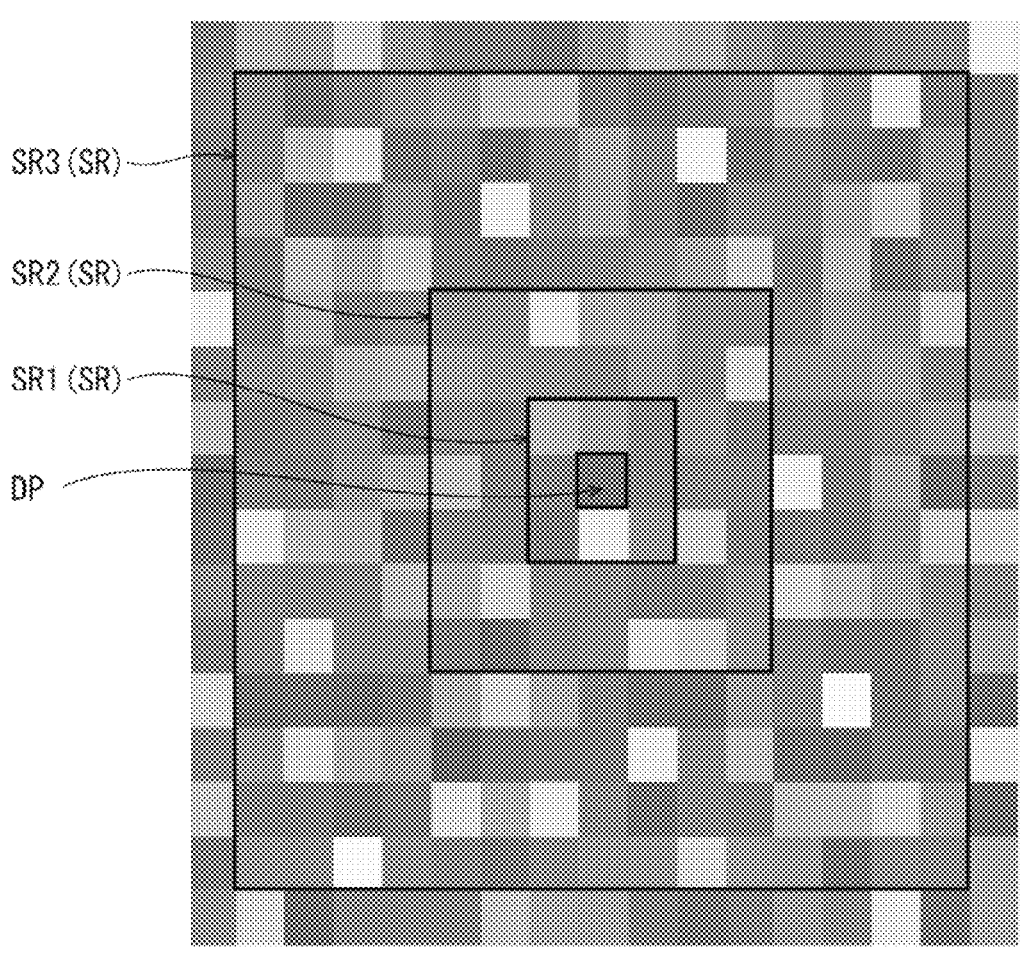
SR3 (SR)
SR2 (SR)
SR1 (SR)
DP
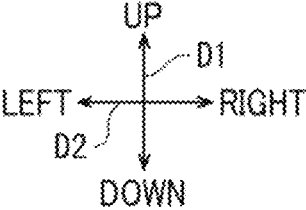

| IMAGE RESOLUTION | PRINTING RESOLUTION | THE NUMBER OF EXPANSION DOTS | | SELECTION RANGE | PATCH GENERATION COLOR | | |
|---|---|---|---|---|---|---|---|
| [dpi] | [dpi] | LEFT-RIGHT DIRECTION | VERTICAL DIRECTION | | R | G | B |
| 2400 | 2400 | 0 | 0 | 1 x 1 | 197 | 3 | 100 |
| 2400 | 1200 | 1 | 1 | 3 x 3 | 209 | 61 | 111 |
| 2400 | 600 | 3 | 3 | 7 x 7 | 217 | 53 | 101 |
| 2400 | 300 | 7 | 7 | 15 x 15 | 215 | 53 | 104 |

FIG. 7
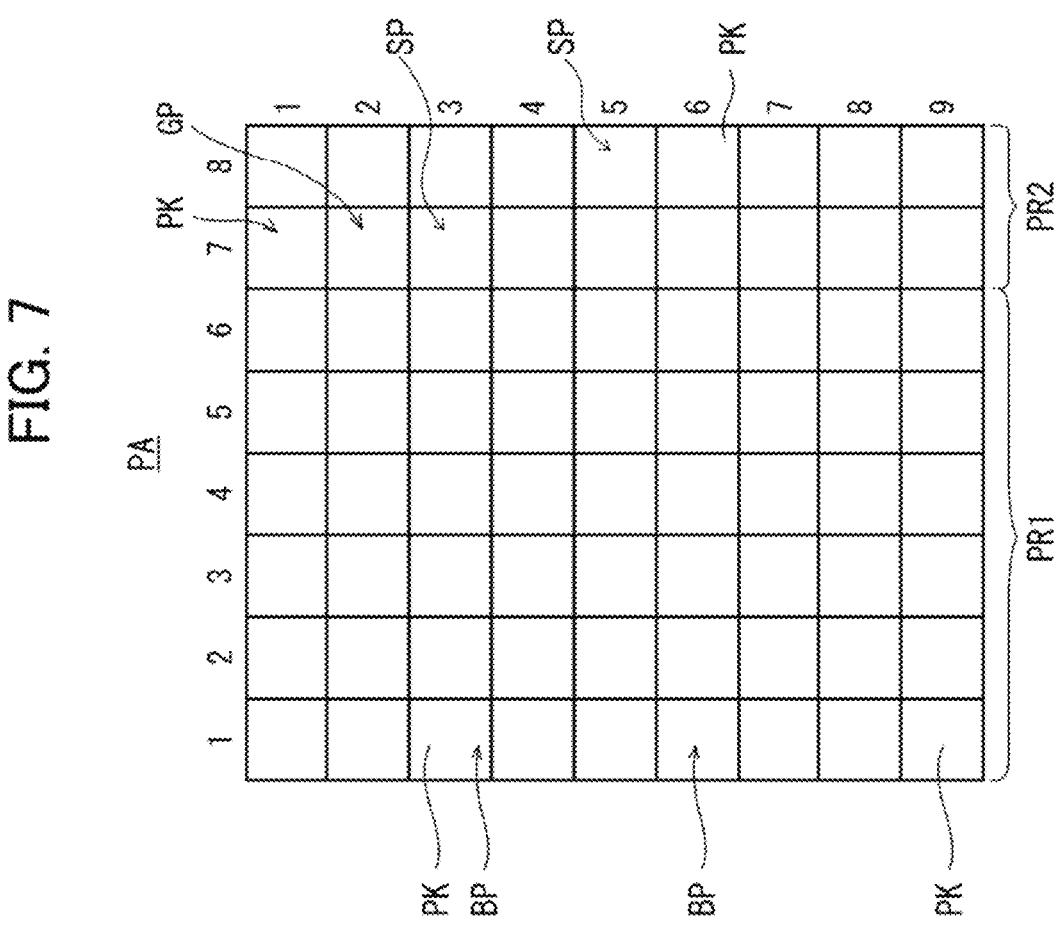

| IMAGE RESOLUTION | PRINTING RESOLUTION | THE NUMBER OF EXPANSION DOTS | | SELECTION RANGE |
|---|---|---|---|---|
| [dpi] | [dpi] | LEFT-RIGHT DIRECTION | VERTICAL DIRECTION | |
| 300 | 300 | 0 | 0 | 1 x 1 |
| 300 | 600 | 0 | 0 | 1 x 1 |
| 300 | 1200 | 0 | 0 | 1 x 1 |
| 300 | 2400 | 0 | 0 | 1 x 1 |
| 600 | 300 | 1 | 1 | 3 x 3 |
| 600 | 600 | 0 | 0 | 1 x 1 |
| 600 | 1200 | 0 | 0 | 1 x 1 |
| 600 | 2400 | 0 | 0 | 1 x 1 |
| 1200 | 300 | 3 | 3 | 7 x 7 |
| 1200 | 600 | 1 | 1 | 3 x 3 |
| 1200 | 1200 | 0 | 0 | 1 x 1 |
| 1200 | 2400 | 0 | 0 | 1 x 1 |
| 2400 | 300 | 7 | 7 | 1 5 x 1 5 |
| 2400 | 600 | 3 | 3 | 7 x 7 |
| 2400 | 1200 | 1 | 1 | 3 x 3 |
| 2400 | 2400 | 0 | 0 | 1 x 1 |

| IMAGE RESOLUTION | PRINTING RESOLUTION | THE NUMBER OF EXPANSION DOTS | | SELECTION RANGE | PATCH GENERATION COLOR | | | |
|---|---|---|---|---|---|---|---|---|
| [dpi] | [dpi] | LEFT-RIGHT DIRECTION | VERTICAL DIRECTION | | No. | R | G | B |
| 2400 | 1200 | 1 | 1 | 3 × 3 | 1 | 193 | 116 | 180 |
| | | | | | 2 | 214 | 24 | 80 |
| | | | | | 3 | 198 | 80 | 121 |
| | | | | | 4 | 228 | 72 | 114 |
| | | | | | 5 | 197 | 3 | 100 |
| | | | | | 6 | 219 | 156 | 129 |
| | | | | | 7 | 208 | 56 | 72 |
| | | | | | 8 | 215 | 6 | 125 |
| | | | | | 9 | 211 | 80 | 76 |

| IMAGE RESOLUTION [dpi] | PRINTING RESOLUTION [dpi] | THE NUMBER OF EXPANSION DOTS | | SELECTION RANGE | NUMBER OF PATCH IMAGES | COLOR INFO. IN SELECTION RANGE | | | | EUCLID DISTANCE FROM AVERAGE | | | | | PRIORITY | GENERATION OF PATCH? |
|---|---|---|---|---|---|---|---|---|---|---|---|---|---|---|---|---|
| | | LEFT-RIGHT DIRECTION | VERTICAL DIRECTION | | | No | R | G | B | No. | R | G | B | | | |
| 2400 | 1200 | 1 | 1 | 3 × 3 | 3 | 1 | 193 | 116 | 180 | 1 | −16 | 50 | 69 | 87 | 8 | NOT GENERATE |
| | | | | | | 2 | 214 | 24 | 80 | 2 | 4.8 | −42 | −31 | 52 | 5 | NOT GENERATE |
| | | | | | | 3 | 198 | 80 | 121 | 3 | −11 | 14 | 10 | 21 | 2 | GENERATE |
| | | | | | | 4 | 228 | 72 | 114 | 4 | 19 | 6.1 | 3.2 | 20 | 1 | GENERATE |
| | | | | | | 5 | 197 | 3 | 100 | 5 | −12 | −63 | −11 | 65 | 7 | NOT GENERATE |
| | | | | | | 6 | 219 | 156 | 129 | 6 | 9.8 | 90 | 18 | 92 | 9 | NOT GENERATE |
| | | | | | | 7 | 208 | 56 | 72 | 7 | −1 | −10 | −39 | 40 | 4 | NOT GENERATE |
| | | | | | | 8 | 215 | 6 | 125 | 8 | 5.8 | −60 | 14 | 62 | 6 | NOT GENERATE |
| | | | | | | 9 | 211 | 80 | 76 | 9 | 1.9 | 14 | −35 | 38 | 3 | GENERATE |
| | | | | | | AVERAGE | 209 | 66 | 111 | - | - | - | - | - | - | - |

FIG. 11

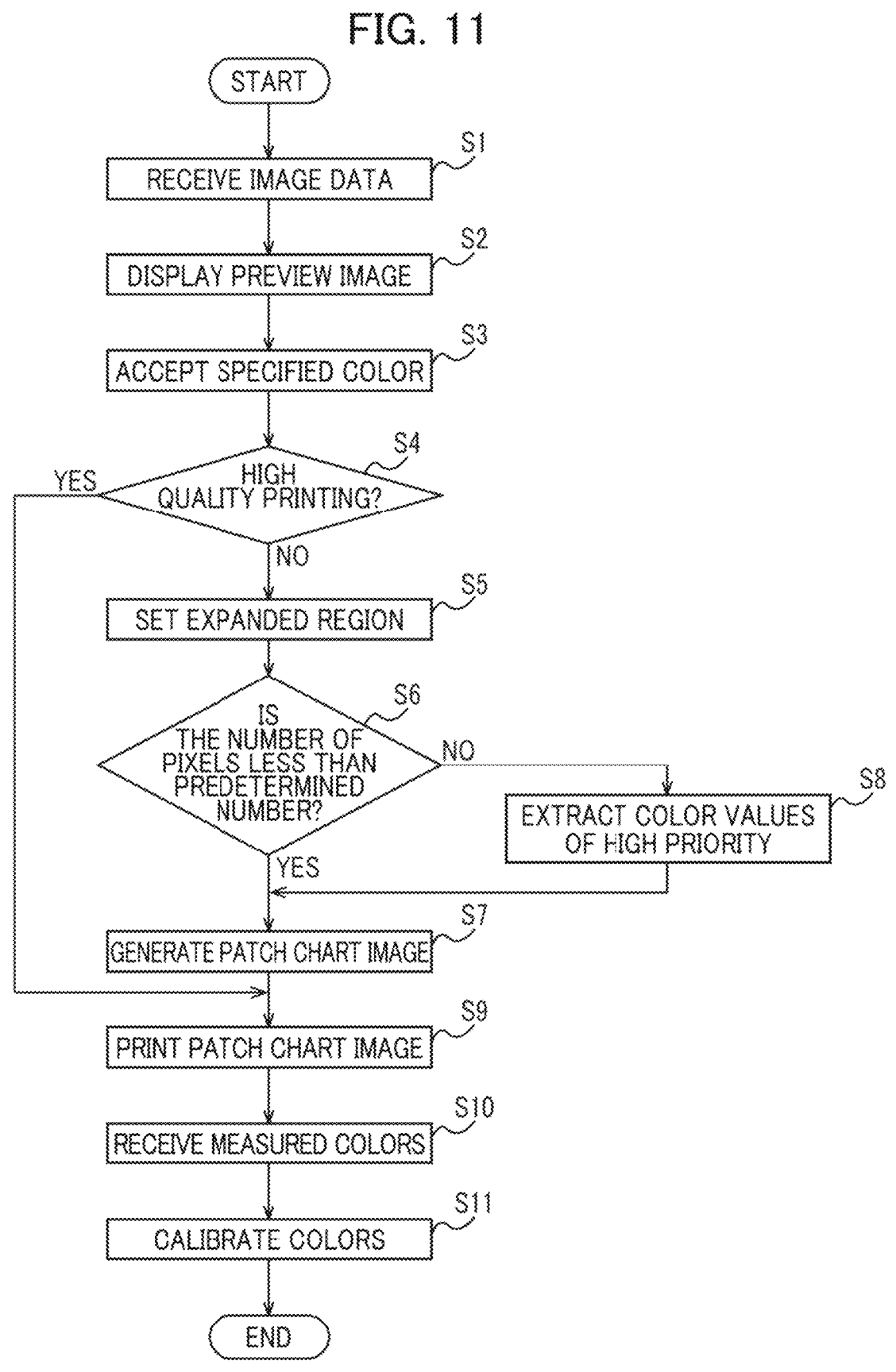

START

S1
RECEIVE IMAGE DATA

S2
DISPLAY PREVIEW IMAGE

S3
ACCEPT SPECIFIED COLOR

S4
HIGH QUALITY PRINTING?

YES

NO

S5
SET EXPANDED REGION

S6
IS THE NUMBER OF PIXELS LESS THAN PREDETERMINED NUMBER?

NO

YES

S8
EXTRACT COLOR VALUES OF HIGH PRIORITY

S7
GENERATE PATCH CHART IMAGE

S9
PRINT PATCH CHART IMAGE

S10
RECEIVE MEASURED COLORS

S11
CALIBRATE COLORS

END

PRINTING DEVICE SETTING EXPANDED REGION AND GENERATING PATCH CHART PRINT DATA BASED ON PIXELS IN EXPANDED REGION

REFERENCE TO RELATED APPLICATIONS

This application claims priority from Japanese Patent Application No. 2022-103363 filed on Jun. 28, 2022. The entire content of the priority application is incorporated herein by reference.

BACKGROUND ART

Some conventional printers are capable of displaying a preview screen of the data to be printed and prompting the user to specify a color in the preview image for which a patch will be created. After the user has specified a color using a cursor, the printer prints a patch in the user-specified color together with existing color patches. A colorimeter is used to measure all calibration patches in the entire image printed by the printer, and the printer executes color calibration on the image data to be printed on the basis of the colorimetric data obtained from the colorimeter.

DESCRIPTION

However, the user may be unable to specify a desired position in the preview screen properly due to imprecise operations of the cursor, resulting in a discrepancy between the position of the color actually specified by the user and the position of the color the user intended to specify. Consequently, the conventional technology may be incapable of suitably calibrating the user's desired color, leading to lower accuracy in color calibrations.

In view of the foregoing, it is an object of the present disclosure to provide a printing device, printing method, and printing program capable of suppressing a drop in accuracy when calibrating a user's desired color.

In order to attain the above and other object, the present disclosure provides a printing device. The printing device includes a print head, a storage, and a controller. The print head is configured to perform printing based on image data on a printing medium. The image data represents an original image including a plurality of original pixels. The storage stores information on printing resolutions in which the print head can perform printing. The controller configured to perform: displaying a preview image based on the image data, the preview image including a plurality of preview-image pixels, each preview-image pixel corresponding to one of the plurality of original pixels in the original image and having a color based on at least a color of the corresponding original pixel; receiving information on a preview-image pixel specified by a user among the plurality of preview-image pixels included in the preview image; setting an expanded region in the original image on the basis of a printing resolution in which printing based on the image data is to be performed among the printing resolutions stored in the storage, the expanded region including original pixels of the plurality of original pixels, the original pixels included in the expanded region including an original pixel corresponding to the specified preview pixel; generating patch chart print data based on color values of at least two original pixels among the original pixels in the expanded region, the patch chart print data representing a patch chart image; and controlling the print head to print the patch chart image represented by the patch chart print data based on color values of at least two original pixels among the original pixels in the expanded region.

According to another aspect, the disclosure provides a printing method for controlling a printing device including: a print head configured to perform printing based on image data on a printing medium, the image data representing an original image including a plurality of original pixels; a storage storing information on printing resolutions in which the print head can perform printing. The printing method includes: displaying a preview image based on the image data, the preview image including a plurality of preview-image pixels, each preview-image pixel corresponding to one of the plurality of original pixels in the original image and having a color based on at least a color of the corresponding original pixel; receiving information on a preview-image pixel specified by a user among the plurality of preview-image pixels included in the preview image; setting an expanded region in the original image on the basis of a printing resolution in which printing based on the image data is to be performed among the printing resolutions stored in the storage, the expanded region including original pixels of the plurality of original pixels, the original pixels in the expanded region including an original pixel corresponding to the specified preview pixel; generating patch chart print data based on color values of at least two original pixels among the original pixels in the expanded region, the patch chart print data representing a patch chart image; and controlling the print head to print the patch chart image represented by the patch chart print data based on color values of at least two original pixels among the original pixels in the expanded region.

According to still another aspect, the disclosure provides a non-transitory computer readable storage medium storing a set of program instructions for controlling a printing device including: a print head configured to perform printing based on image data on a printing medium, the image data representing an original image includes a plurality of original pixels; and a storage storing information on printing resolutions in which the print head can perform printing. The set of program instructions includes: displaying a preview image based on the image data, the preview image including a plurality of preview-image pixels, each preview-image pixel corresponding to one of the plurality of original pixels in the original image and having a color based on at least a color of the corresponding original pixel; receiving information on a preview-image pixel specified by a user among the plurality of preview-image pixels included in the preview image; setting an expanded region in the original image on the basis of a printing resolution in which printing based on the image data is to be performed among the printing resolutions stored in the storage, the expanded region including original pixels of the plurality of original pixels, the original pixels in the expanded region including an original pixel corresponding to the specified preview pixel; generating patch chart print data based on color values of at least two original pixels among the original pixels in the expanded region, the patch chart print data representing a patch chart image; and controlling the print head to print the patch chart image represented by the patch chart print data based on color values of at least two original pixels among the original pixels in the expanded region.

In the above structure, the user-specified color can be properly calibrated while suppressing a decline in the accuracy of color calibration.

FIG. 5 is an explanatory diagram illustrating expanded regions.

FIG. 6 is a table defining the expanded regions and the numbers of pixels therein.

FIG. 7 is an explanatory diagram illustrating a patch image in which a plurality of patch images is arranged.

FIG. 8 is a table defining the expanded regions and the numbers of pixels therein to be used to determine whether to acquire the expanded region.

FIG. 9 is a table illustrating color values of pixels in the expanded region associated with a combination of an image resolution and a printing resolution.

FIG. 10 is a table illustrating a priority of each patch image based on a Euclidian distance to determine whether to print the patch image.

FIG. 11 is a flowchart illustrating a color calibration process.

A printing device according to an embodiment will be described while referring to accompanied drawings. The printing device described below is merely an example. The present invention is not limited to the embodiment and can be modified, and thus some features may be added or/and deleted.

Figure 1:
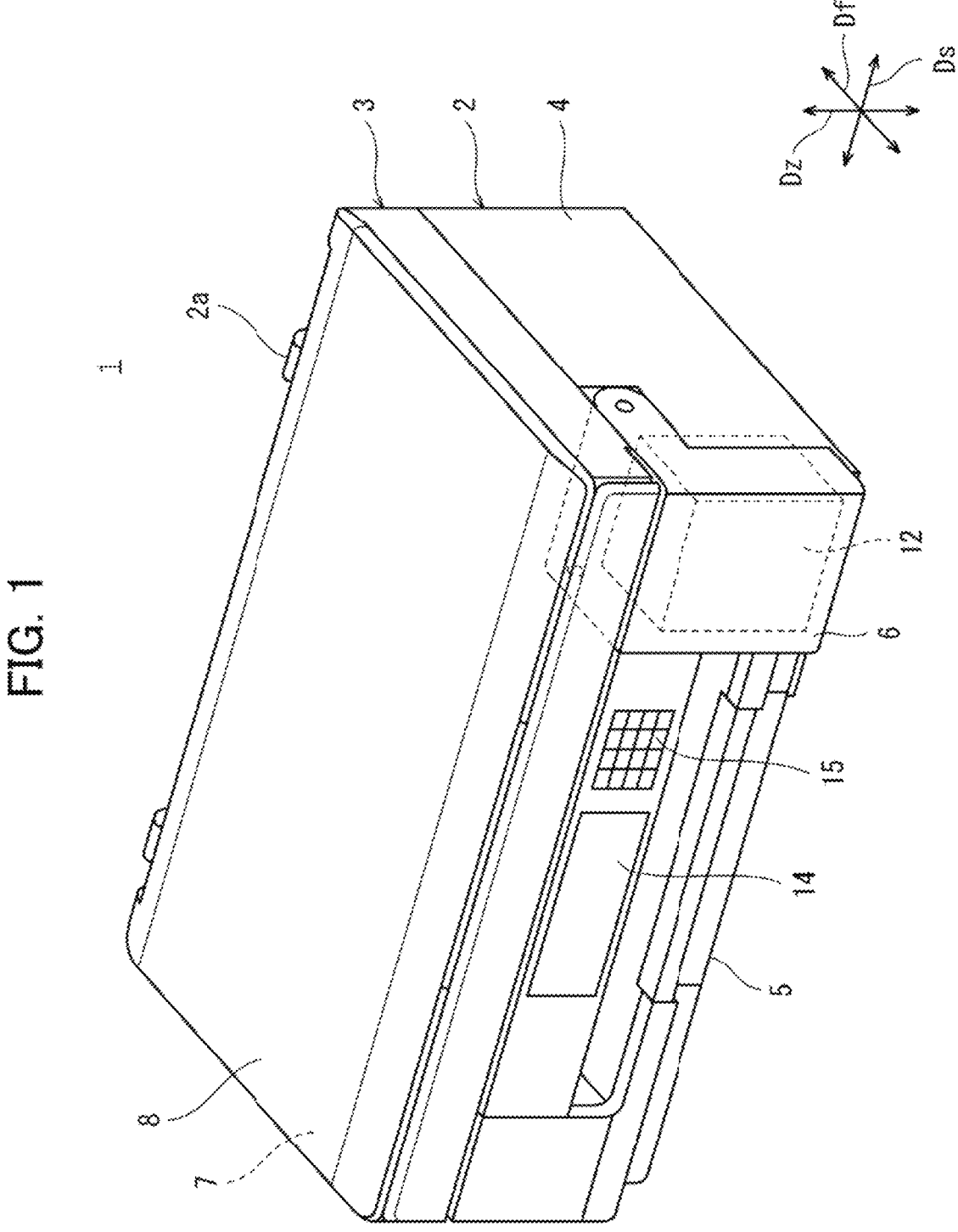
FIG. 1 is a perspective view of a printing device.

FIG. 1 is a perspective view showing the printing device 1 according to one embodiment of the disclosure. In FIG. 1, a first direction Ds, a second direction Df, and a third direction Dz are each orthogonal to the others. In this embodiment, the first direction Ds is the moving direction of a carriage 41 described later, the second direction Df is the conveying direction of a print medium W described later, and the third direction Dz is the up-down direction, for example. Thus, in the following description, Ds will be called the moving direction, Df will be called the conveying direction, and Dz will be called the up-down direction.

As shown in FIG. 1, the printing device 1 is an inkjet printer that prints images on a print medium W (see FIG. 2), such as a printing paper. The exterior of the printing device 1 has a parallelepiped shape. The printing device 1 is provided with a printing unit 2, and a scanning unit 3. However, the printing device 1 in FIG. 1 is merely an example and is not limited to this configuration. For example, the printing device 1 may be provided with a printing unit (ejection head) that ejects UV-curable ink droplets, and a light source that cures the ink droplets with ultraviolet light. In other words, the printing unit 2 is a print engine to execute a printing operation.

The scanning unit 3 has an image sensor that reads images and generates image data. That is, the scanning unit 3 is a scanner or a scanning engine to execute a scanning operation. The printing unit 2 prints this generated image data on a print medium W either accommodated in the printing device 1 or supplied into the printing device 1 from outside. The scanning unit 3 having this configuration is arranged on top of the printing unit 2 and is coupled to the printing unit 2 by coupling parts 2a provided on the rear portion of the printing unit 2. When the front portion of the scanning unit 3 is lifted, the printing unit 2 rotates upward about the coupling parts 2a, exposing the inside of the printing unit 2.

The scanning unit 3 has a document platen 7, and a cover 8. The cover 8 is arranged to cover the top of the document platen 7. The scanning unit 3 scans images recorded on an original while the original is positioned between the document platen 7 and the cover 8.

The printing unit 2 prints images on print media W with ink supplied from tanks 12 described later. The printing unit 2 has a case 4 that forms part of the housing of the printing device 1. A cover 6 is mounted on the case 4 and can open and close over an opening that communicates with an interior space of the case 4. A tray 5 for accommodating the print media W is disposed inside the case 4. The tray 5 can be pulled out to the front of the case 4 for loading print media W.

The tanks 12 store ink. The tanks 12 are exposed outside the case 4 when the cover 6 is open. The tanks 12 are connected to ejection heads 20 (see FIG. 2) via channels that supply ink to the ejection heads 20.

Figure 2:
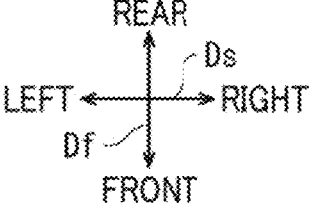
FIG. 2 is a plan view illustrating an ejection head provided in the printing device.

As shown in FIG. 2, the printing device 1 is a serial printer having a plurality of ejection heads 20, a platen 11, a plurality of tanks 12, a conveying device 30, and a scanning device 40. However, the printing device 1 may also be configured as a line head printer. In this case, the scanning device 40 is omitted from the printing device 1, and the ejection heads 20 are immobile and have a length in the moving direction Ds greater than the printing area on the print medium W.

The ejection heads 20 use ink in primary colors (described later) to print images on print media W based on image data. In the present embodiment, the ejection heads 20 correspond to the printing unit. The ejection heads 20 include two first ejection heads 21, and two second ejection heads 22, for example. The platen 11 has a flat top surface and defines the distance between a print medium W placed on this top surface and the bottom surface of the ejection heads 20 disposed in opposition to this top surface. The tanks 12 are containers for storing ink. The number of tanks 12 is equal to or greater than the number of ink types. For example, the tanks 12 have four first tanks 12a that respectively store ink in one of the four primary colors, and one or a plurality of second tanks 12b that store ink in special colors.

Examples of primary color inks are cyan ink, yellow ink, magenta ink, and black ink. Special color inks have different colors from the primary colors. Examples of special color inks are red ink, green ink, and blue ink.

The first tanks 12a store ink in the primary colors and communicate with the first ejection heads 21 through first channels 13a. Ink in the primary colors is supplied from the first tanks 12a to the first ejection heads 21 via the first channels 13a. The second tanks 12b communicate with the second ejection heads 22 via second channels 13b. When the second tanks 12b store ink in special colors, the special color inks flow from the second tanks 12b into the second channels 13b, filling the second channels 13b. From the second channels 13b, the special color inks are supplied to the ejection heads 20. Before ink in special colors is stored in the second tanks 12b, the second tanks 12b are filled with a storage solution. The first channels 13a and second channels 13b are rubber or plastic tubes, for example, which are preferably resistant to kinking.

The conveying device 30 has two sets of conveying rollers 31, and a conveying motor 32 (see FIG. 3), for example. The two sets of conveying rollers 31 are arranged so that the platen 11 is in between the two sets of conveying rollers in the conveying direction Df (front-rear direction). The conveying rollers 31 have axes aligned in the moving direction Ds. In each set, the conveying rollers 31 are aligned in the up-down direction Dz and is configured to nip a print medium W therebetween. One conveying roller 31 in each set is connected to the conveying motor 32. The conveying rollers 31 rotate about their axes when driven by the conveying motor 32 and convey a print medium W over the platen 11 in the conveying direction Df.

The scanning device 40 has a carriage 41, two guide rails 42, a scanning motor 43, and an endless belt 44. The two guide rails 42 extend in the moving direction Ds over the platen 11 so that the ejection heads 20 are interposed between the guide rails 42 in the conveying direction Df. The carriage 41 supports the ejection heads 20. The carriage 41 is supported on the guide rails 42 to be movable in the moving direction Ds. The endless belt 44 extends in the moving direction Ds and is attached to the carriage 41. The endless belt 44 is also attached to the scanning motor 43 via a pulley 45. When the scanning motor 43 is driven, the endless belt 44 circulates and the carriage 41 reciprocates in the moving direction Ds along the guide rails 42. In this way, the carriage 41 moves the ejection heads 20 in the moving direction Ds.

Figure 3:
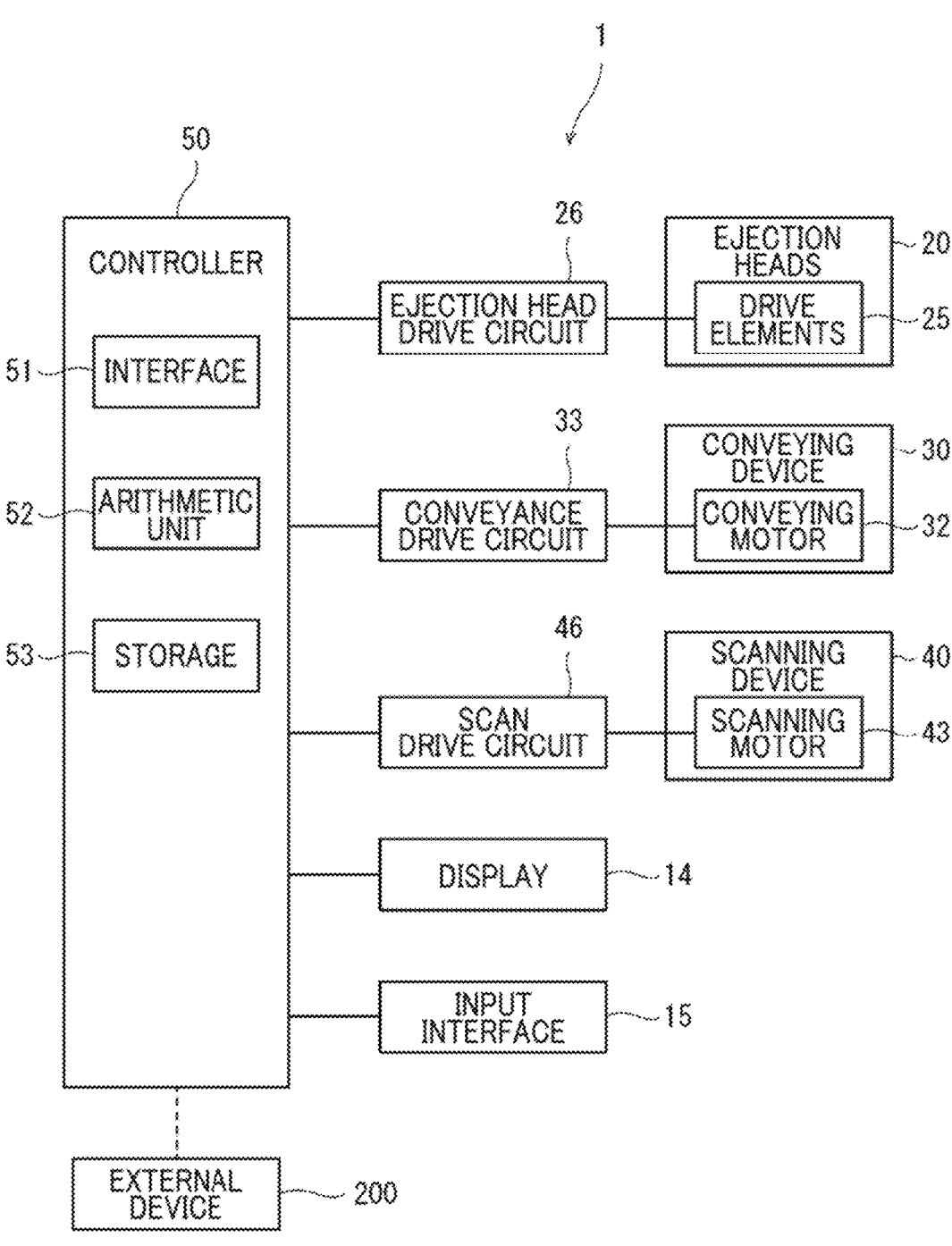
FIG. 3 is a block diagram illustrating electric configurations of the printing device.

As shown in FIG. 3, the ejection heads 20 have a plurality of drive elements 25. The drive elements 25 may be piezo-electric elements, heating elements, electrostatic actuators, and the like. The drive elements 25 are provided for respective nozzles in the ejection heads 20 and apply pressure to eject ink from the corresponding nozzles.

The printing device 1 is further provided with a display 14, an input interface 15, and a controller 50. The controller 50 corresponds to the computer and has an interface 51, an arithmetic unit 52, and a storage 53. The interface 51 receives image data and other various data from an external device 200. The external device 200 may be a computer, a camera, a communication network, a storage medium, a display, a printer, or the like. The image data is raster data representing an image to be printed on the print medium W. The image data includes information on printing conditions such as the type of print medium W. The controller 50 may be configured as a single device, or a plurality of devices in a distributed arrangement. In the latter case, the devices interact with each other to operate the printing device 1.

The storage 53 is memory that the arithmetic unit 52 can access. The storage 53 stores information on printing resolutions of the printing device 1, i.e., the resolutions that the ejection heads 20 can achieve. The storage 53 has RAM and ROM. The RAM temporarily stores various data, including data received from the external device 200, such as image data, and data converted by the arithmetic unit 52. The ROM stores a printing program, prescribed data, and the like for executing various data processes. As an alternative to the storage 53, the printing program may be stored in an external storage medium such as a CD-ROM that is accessible by the arithmetic unit 52.

The arithmetic unit 52 includes a CPU or other processor and at least one circuit, such as an ASIC or other integrated circuit. By executing the printing program, the arithmetic unit 52 controls the components of the printing device 1 to implement a printing operation and other various operations. In the present embodiment, the arithmetic unit 52 corresponds to the computer, a process or step for controlling the display, process or step for receiving, process or step for acquiring, process or step for generating, and process or step for controlling printing.

In accordance with instructions from the controller 50, the display 14 displays images represented by image data, preview images PI described later, and the like. Note that the display 14 may not be able to display uncalibrated images based on image data or preview images PI that appear exactly the same as when printed on print media W with the ejection heads 20, but this description will assume that the displayed and printed images fall within an equivalent range, if not exactly equal. The input interface 15 is configured of buttons and the like, for example, that the user operates. Alternatively, the input interface 15 may be a touchscreen integrated with the display 14.

The controller 50 is electrically connected to the conveying motor 32 of the conveying device 30 via a conveyance drive circuit 33 for controlling the drive of the conveying motor 32. Accordingly, the controller 50 controls conveyance of the print medium W with the conveying device 30. The controller 50 is also electrically connected to the scanning motor 43 of the scanning device 40 via a scan drive circuit 46 for controlling the drive of the scanning motor 43. Accordingly, the controller 50 controls movement of the ejection heads 20 with the scanning device 40. The controller 50 is further electrically connected to the drive elements 25 via an ejection head drive circuit 26. The controller 50 outputs control signals for the drive elements 25 to the ejection head drive circuit 26, and the ejection head drive circuit 26 generates and outputs drive signals to the drive elements 25 on the basis of these control signals. When driven according to the drive signals, the drive elements 25 eject ink from corresponding nozzles.

With the printing device 1 having the above configuration, the controller 50 acquires image data and executes a printing operation based on this image data. At this time, the controller 50 ejects ink onto the print medium W from the ejection heads 20 while moving the ejection heads 20 in the moving direction Ds for each printing pass. Next, the controller 50 conveys the print medium W forward. The printing device 1 repeatedly alternates between a printing pass and a conveying operation in this way to print an image on the print medium W based on the image data.

Figure 4:
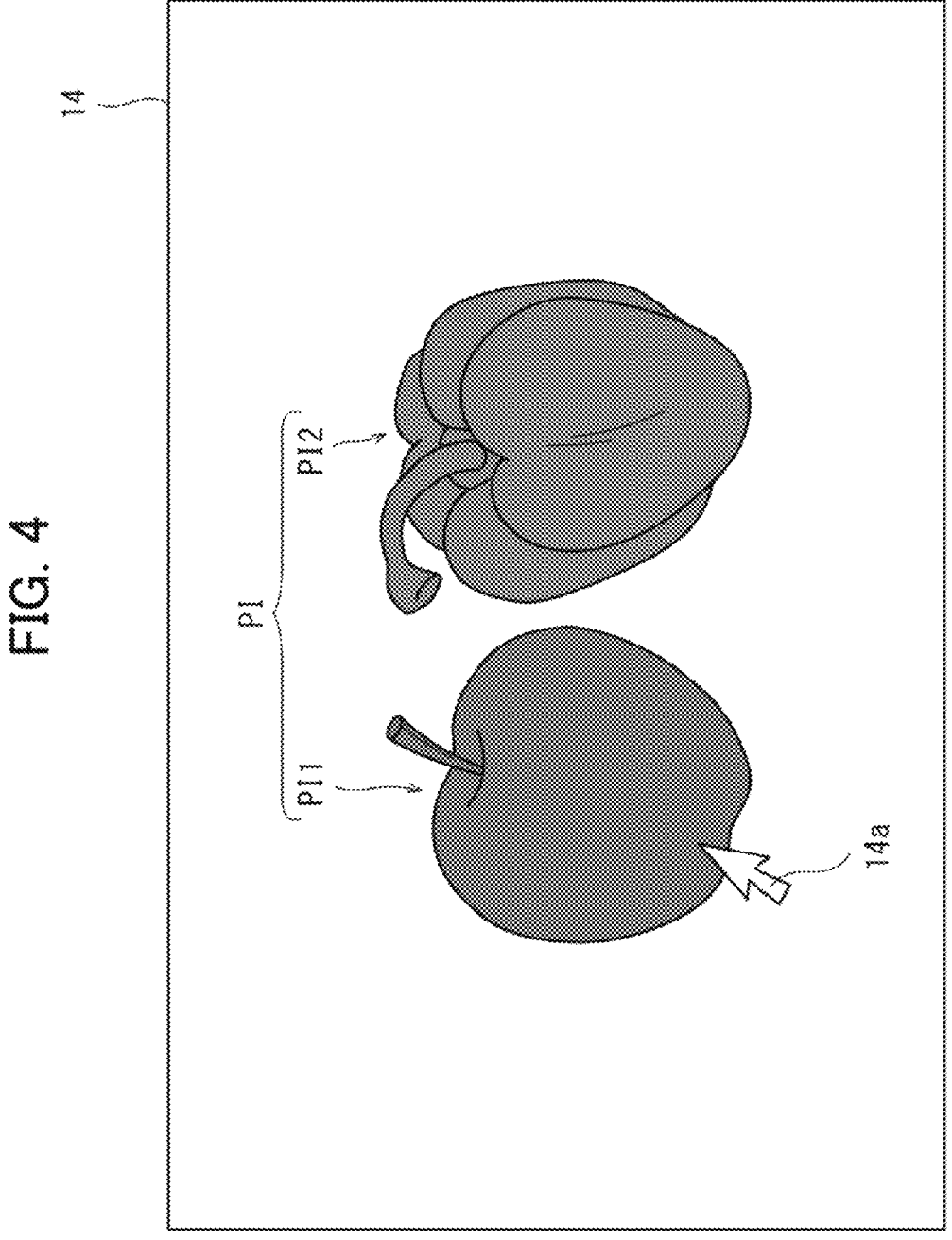
FIG. 4 is an explanatory diagram illustrating an example of a preview image.

FIG. 4 shows a sample preview image PI displayed on the display 14 on the basis of image data. FIG. 5 shows an example of expanded regions SR. FIG. 6 shows a table T1 defining the expanded region SR and thus defining the number of pixels included in the expanded region SR based on the printing resolution. FIG. 6 also shows patch generation colors included in the expanded regions SR. FIG. 7 shows a patch chart image PA in which a plurality of patch images has been arranged. Each patch image is an image of a single color.

The controller 50 receives image data (original image data) for which the printing is to be executed from the external device 200. Here, the printing based on the image data is to be executed. The image data includes color values. In this example, the color values are represented by RGB values in the RGB color space, i.e., as color coordinates in a device-dependent color space. The RGB values express a single color through a combination of a red color value, a green color value, and a blue color value, each of which represents one of a possible 256 gradations (0-255). Alternatively, the controller 50 may use color values obtained by converting the RGB values to Lab values. The Lab values are color values in the device-independent L*a*b* color space expressed by Cartesian coordinates, with L representing lightness and a and b representing hue and saturation.

As shown in FIG. 4, the controller 50 displays a preview image PI on the display 14 based on the image data (original image data). The original image data represents an original image. For example, the preview image PI is represented by preview image data. That is, the controller 50 generates the preview image data based on the image data. The preview image PI includes a plurality of pixels. Hereinafter, pixels in the preview image PI are referred to as "preview-image pixels" and pixels in the original image are referred to as "original pixels". Each preview-image pixel corresponds to one original pixel in the image (original image) represented by the image data (original image data) and has a color based on at least a color of the corresponding original pixel in the original image. Hereinafter, the original pixel corresponding to the preview-image pixel is referred to as the corresponding original pixel. The original image data represents the original image in the image resolution. The resolution of the preview image PI may be determined on the basis of the printing resolution, in which printing based on the original image data is to be executed, and may be lower than that of the image resolution of the original image represented in the original image data, or the same as the image resolution of the original image. Here, when printing the original image, the image data is converted into print data so that the generated print data represents an image in a printing resolution. Color values of each preview-image pixels are based on at least one of color values of original pixels in a corresponding region in the original image. Here, the corresponding region in the original image includes the corresponding original pixel and one or more peripheral original pixels of the corresponding original pixel. In other words, an original pixel corresponding to a preview-image pixel indicates a representative pixel among original pixels in the corresponding region in the original image. In a case that the resolution of the preview image PI is the same as that of the original image, the position of a preview-image pixel is the same as the position of an original pixel corresponding to the preview-image pixel.

The example of the preview image PI in FIG. 4 includes an apple image PI1, and a bell pepper image PI2. When the preview image PI is displayed on the display 14, the user specifies a preview-image pixel (an image at a position) having the color in which the user wishes to create a patch image. In this case, the preview-image pixel or the position specified by the user is indicated by a pointer 14a on the display 14. FIG. 4 shows that the user has specified a preview-image pixel in the apple image PI1.

When the user specifies one of the plurality of preview-image pixels in the preview image PI, the controller 50 receives information on the user-specified preview-image pixel. In the example of FIG. 4, the controller 50 receives information on the preview-image pixel that the user specified in the apple image PI1 (for example, the information including the position and color of the preview-image pixel).

After receiving information on the user-specified preview-image pixel, the controller 50 sets the expanded region SR in the original image described later, on the basis of the printing resolution among the printing resolutions stored in the storage 53, in which printing based on the original image data is to be executed, to a region including a plurality of original pixels that includes an original pixel corresponding to the user-specified preview-image pixel. Subsequently, the controller 50 generates one or more patch images GP (see FIG. 7) on the basis of color values of original pixels in the expanded region SR in the original image, generates print data (patch chart print data) for the patch chart image PA that includes the plurality of patch images GP in addition to information on the positions of the patch images GP, and controls the ejection heads 20 to print the patch images GP on the basis of the print data.

Prior to printing the patch images GP with the ejection heads 20, the controller 50 converts the RGB values in the print data to Lab values, and generates print data from the Lab values for cyan, yellow, magenta, and black ink colors. The controller 50 then further converts the print data for each color to data specifying the quantities of ink to be ejected (ejection data). The controller 50 controls the ejection heads 20 to print the patch images GP by ejecting ink based on the ejection data for each color of ink. Because the printing device 1 of the present embodiment is a serial printer having the carriage 41, the ejection data is further divided according to the number of passes executed by the carriage 41. For example, ejection data is divided into three parts to complete printing in three passes of the carriage 41.

Next, the expanded region SR will be described in detail. As shown in FIG. 6, the table T1 includes information on the image resolution of the image data, the printing resolutions, the number of dots to expand the selection range (the number of expansion dots), and the selection range (the expanded region SR). The selection range defines a range from which color values are selected from the original image for generating patch images GP and specifies the range of the expanded region SR in the original image. The selection range is represented by the number of dots in the left-right direction and the number of dots (pixels) in the vertical direction. In other words, the selection range defines the number of pixels or dots included in the expanded region SR. The table T1 is stored in the storage 53 in advance. As shown in the table T1, the number of dots to expand the selection range (the range of the expanded region SR) and the selection range are defined for a combination of the image resolution and the printing resolution. FIG. 6 includes the patch generation color for each combination of the image resolution and the printing resolution as an example. Note that the table T1 does not include the patch generation colors because the patch generation colors are obtained from the image data. The patch generation color may be acquired in a process shown in FIG. 11 described later.

As an example, when the image resolution and the printing resolution are both 2400 dpi, i.e., when the image resolution and the printing resolution are the same, the numbers of dots to expand the selection range are "0" and thus the number of dots in the selection range specifies "1 (=1×1) dot. In this case, the controller 50 does not set an expanded region SR based on an original pixel DP corresponding to the user-specified preview-image pixel, as in the example of FIG. 5. In this case, the controller 50 generates, as an image for a special patch (described later), only a patch image GP based on the color values in the prescribed color space of the corresponding original pixel DP. In other words, the expanded region SR is equivalent to the region of the corresponding original pixel DP in this case. The color values (R=197, G=3, and B=100) in the table T1 of FIG. 6 are one example. In addition to RGB values in the RGB color space, Lab values in the L*a*b* color space may be used.

On the other hand, when the printing resolution is smaller than the image resolution, the controller 50 executes the following process. For example, when the image resolution is 2400 dpi while the printing resolution is 1200 dpi, the controller 50 acquires an expanded region SR1 by expanding a selection range (range of one pixels) one pixel (one dot) each way in a vertical direction D1 and one pixel (one dot) each way in a left-right direction D2 from the pixel DP corresponding to the user-specified preview-image pixel, as shown in FIG. 5. In other words, the controller 50 obtains an expanded region SR1 including nine pixels (3×3). Put another way, for acquiring the expanded region SR, the controller 50 expands a range of the corresponding original pixel DP (hereinafter, referred to as the pixel range), as follows. That is, for the left-right range, the controller 50 expands the pixel range from the range of the corresponding original pixel DP by the number of expansion dots on each side (each of upstream side and downstream side) of the corresponding original pixel DP with respect to the left-right direction D2. Further, for the vertical range, the controller 50 expands the pixel range by the number of expansion dots on each side (each of upstream side and downstream side) of the corresponding original pixel DP with respect to the vertical direction D1. That is, the selection range is expressed by [2×(the number of expansion dots in the left-right direction)+1]×[2×(the number of expansion dots in the left-right direction)+1]. The expanded region SR2 can be similarly acquired according to this expression for the combination of the image resolution 2400 dpi and the printing resolution 600 dpi. The expanded region SR3 can be acquired according to this expression for the combination of the image resolution 2400 dpi and the printing resolution 300 dpi. The expanded region SR may be a continuous region including a plurality of original pixels having an original pixel corresponding to the user-specified preview-image pixel and one or more original pixels neighboring the original pixel corresponding to the user-specified preview-image pixel.

Next, the controller 50 calculates the average value for each of the RGB values of the nine acquired original pixels. The patch generation color of FIG. 6 indicates that the averages of the RGB values are R=209, G=61, and B=111. Here, the average value for R (209) is calculated by adding the R values for all nine pixels in the selection range and dividing by 9; the average value for G (61) is calculated by adding the G values for all nine pixels in the selection range and dividing by 9; and the average value for B (111) is calculated by adding the B values for all nine pixels in the selection range and dividing by 9. The controller 50 then generates a patch image GP for the color values based on the averaged RGB values. The processes executed by the controller 50 for other combinations of the image resolution and the printing resolution such as the combination of (2400 dpi, 600 dpi) and the combination of (2400 dpi, 300 dpi) are similar and, hence, a description of these processes will be omitted.

The controller 50 may also calculate the average value for each of the Lab values in the L*a*b* color space for the nine pixels acquired as described above. In this case, the controller 50 can generate a patch image GP for the color values based on the averaged Lab values. When a patch image GP is generated in Lab values, the controller 50 may convert the Lab values in the patch image GP to CMYK values to generate cyan print data, magenta print data, yellow print data, and black print data. Note that the Lab values in the generated patch image GP may be converted to RGB values, but this would increase processing load since the RGB values would need to be reconverted to Lab values for printing.

As shown in FIG. 7, the patch chart image PA includes a first patch area PR1 in which basic patches BP are arranged and a second patch area PR2 in which one or more special patches BP are arranged. The second patch area PR2 is different from the first patch area PR1 that constitutes a margin area adjacent to the first patch area PR1 in the moving direction Ds. Each of the first patch area PR1 and the second patch area PR2 has a plurality of patch cells PK. Each patch cell PK is a compartment having a predetermined area for arranging a patch image to be printed. Here, the basic patches BP are patch images arranged in predetermined patch cells PK and corresponding to respective ones of a plurality of basic colors. The plurality of basic colors is predetermined colors, and thus always included in the patch chart image P irrespective of the original image data with which printing is to be executed. For example, the basic colors are the colors of a prescribed number of grid points (for example, 9*9*9 grid points in the RGB color space in the gradation range 0-255, wherein nine grip points are arranged on each of R, G, and B axes). The controller 50 arranges one or more patch images GP generated above in a vacant patch cell PK of the second patch area PR2 as one or more special patches, and generates print data for the patch chart image PA having one or more patch images GP laid out in the second patch area PR2.

In the present embodiment, the controller 50 may determine, on the basis of the printing mode, whether to acquire an expanded region SR. Specifically, the user can use the input interface 15 to specify the printing mode of the ejection heads 20 as a first printing mode, or a second printing mode capable of printing with a higher image quality than that of the first printing mode. In the second printing mode, the printing resolution of the ejection heads 20 is higher than or equal to a predetermined resolution. For example, the printing resolution in the second printing mode may be 1200 dpi or higher. The printing resolution in the first printing mode is less than the printing resolution in the second printing mode, and may be less than 1200 dpi. The controller 50 acquires instruction information that indicates whether the printing mode is to be the first printing mode or the second printing mode according to the above user instructions. This information is an example of mode information.

When the user-specified printing mode is the first printing mode, the controller 50 executes the process described above to set an expanded region SR. However, when the user-specified printing mode is the second printing mode, the controller 50 does not execute the process to set an expanded region SR.

Here, the controller 50 can determine the number of original pixels included in the expanded region SR on the basis of the size relationship between the image resolution of the image data and the printing resolution (or the combination of the image resolution and the printing resolution). FIG. 8 shows a table T2 for defining whether the controller 50 is to set an expanded region SR. The table T2 is stored in the storage 53 in advance. Because the table T2 includes all the information in the table T1 shown in FIG. 6, the table T1 may not be stored in the storage 53 when the table T2 is stored in the storage 53 in advance.

In the table T2 shown in FIG. 8, the number of original pixels constituting the expanded region SR is defined based on the size relationship between the image resolution and the printing resolution. Specifically, when the image resolution is greater than or equal to the printing resolution, the number of dots for expanding the selected range is obtained from (image resolution/printing resolution)−1. For example, when the image resolution is 600 dpi and the printing resolution is 300 dpi, the number of dots for extending the selected range in the table T2 is found by (600/300)−1=1. In this case, the controller 50 acquires the expanded region SR1 including nine pixels by expanding the selection range one pixel (one dot) each way in the vertical direction D1 and one pixel (one dot) each way in the left-right direction D2 from the pixel DP corresponding to the user-specified preview-image pixel described above.

Alternatively, when the image resolution is 1200 dpi and the printing resolution is 1200 dpi, the number of dots for expanding the selected range in table T2 is found from (1200/1200)−1=0. In this case, the controller 50 does not set an expanded region SR based on the pixel DP corresponding to the user-specified preview-image pixel. Accordingly, the controller 50 generates a patch image GP based on the color values in the prescribed color space of the corresponding original pixel DP, as described above.

When the image resolution is less than the printing resolution, the number of dots for expanding the selection range is 0. In other words, the controller 50 does not acquire an expanded region SR based on the corresponding original pixel DP corresponding to the user-specified preview-image pixel. In this case, the controller 50 generates a patch image GP based on the color values in the prescribed color space of the corresponding original pixel DP.

The controller 50 may generate patch images on the basis of the number of original pixels included in the expanded region SR. FIG. 9 shows a table T3 that associates color values for nine pixels with the combination of the image resolution 2400 dpi and printing resolution 1200 dpi. Here, the nine pixels are pixels in an expanded region SR corresponding to the combination. The table T3 also includes the number of expansion dots, and the selection ranges. As shown in FIG. 9, the color values for each of the nine pixels in the expanded region SR are specified in the column of the patch generation color. The color values corresponding to nine pixels are represented in the RGB color space, for example, and used for patch images. The color values shown in FIG. 9 are examples and based on the original image data from which the color values are extracted. The table T3 (or color values for nine pixels) may be stored in the storage 53 during a process shown in FIG. 11 described later. When a combination of the image resolution and the printing resolution are different from that shown in FIG. 9, color values for patch images for pixels in an expanded region SR corresponding to the combination are acquired and stored in the storage 53 in a manner similar to that of the table T3 during the process shown in FIG. 11 described later.

When the printing mode is the first printing mode, the controller 50 determines and sets the number of original pixels constituting the expanded region SR by using the table T1 or T2. Specifically, when setting the expanded region SR using the table T2 in FIG. 8, the controller 50 may calculate the number of original pixels included in the expanded region SR to obtain the value "9". Though the table T2 shown in FIG. 8 stores as the selection range the number of dots in the left right direction and the number of dots in the vertical range in the form of multiplication, such as 1×1, 3×3, and 7×7, the table T2 may store as the selection range the resultant number of multiplication, such as 1 (the resultant number of multiplication of 1×1), 9 (the resultant number of multiplication of 3×3), and 49 (the resultant number of multiplication of 7×7). In this case, the controller 50 acquires the resultant number from the table T2 as the number of original pixels included in the expanded region SR.

In this example, the controller 50 generates a patch image having the averaged color values for nine pixels, as described above in FIG. 6, but the controller 50 may generate one or more patch images based on whether the number of original pixels included in the expanded region SR is less than a predetermined number, as follows.

In this case, the controller 50 determines whether the number of acquired original pixels is less than a predetermined number serving as a threshold value. The threshold value is stored in the storage 53 and can be set or changed arbitrarily by the user. When the number of acquired original pixels is less than the predetermined number, the controller 50 generates patch images for all the original pixels in the expanded region SR. In a case that the threshold value is ten for example, the controller 50 generates nine patch images having the color values of all the nine pixels in the example of FIG. 9. The controller 50 arranges these nine patch images in vacant patch cells PK of the second patch area PR2 and generates print data for the patch chart image PA with the nine patch images laid out in the second patch area PR2.

On the other hand, when the number of acquired original pixels is greater than or equal to the predetermined number serving as the threshold value, the controller 50 executes the following process. FIG. 10 shows a table T4 including the priority of each patch image based on Euclidean distances and indicating whether to generate a patch image of each original pixels in the expanded region SR for a combination of the image resolution 2400 dpi and the printing resolution 1200 dpi. The table T4 also includes extracted color values for pixels in the expanded region SR. The table T4 may be stored in the storage 53 during the process shown in FIG. 11 described later.

When the number of acquired original pixels is greater than or equal to the predetermined number serving as the threshold, the controller 50 generates patch images for original pixels having a predetermined high priority among the pixels included in the expanded region SR. The predetermined priority is set based on the Euclidean distance within a predetermined color system (e.g., the RGB color space) between the color values of each original pixel in the expanded region SR and the average color values of the plurality of original pixels included in the expanded region SR.

Here, an example of Euclidean distance will be described. The table T4 of FIG. 10 depicts an example of RGB values for the nine pixels. The average RGB values for these nine pixels are R=209, G=66, and B=111. The RGB values for pixel No. 1 among the nine pixels in FIG. 10 are R=193, G=116, and B=180. Therefore, the differences between the average RGB values for the nine pixels and the RGB values for the pixel No. 1 are R=−16, G=50, and B=69. Accordingly, the Euclidean distance is calculated from $\sqrt{A}$, where $A=(-16)^2+50^2+69^2$, which is 87. The Euclidean distances for pixels Nos. 2 through 9 can be similarly calculated.

The table T4 of FIG. 10 defines the priority for patch generation to have higher priority for smaller Euclidean distances and sets the number of patch images to be generated. The user may preset the number of patch images to be generated as desired based on each printing resolution so that a different number of patch images can be set for a different printing resolution. The number of patch images to be generated is set to "3" in the example of the table T4. Therefore, patch generation is set for RGB values having a patch generation priority of 1-3 (pixel Nos. 4, 3, and 9) and is not set for all other RGB values. Accordingly, the controller 50 generates a patch image in the color values of the three pixels having Nos. 4, 3, and 9. The controller 50 arranges the patch images in the colors of these three pixels in vacant patch cells PK of the second patch area PR2 and generates print data for the patch chart image PA in which the patch images for these three pixels are laid out in the second patch area PR2.

FIG. 11 is a flowchart showing a sample color calibration process executed by the controller 50. In S1 of FIG. 11, the controller 50 receives image data (original image data) for executing printing based on the image data. In S1 the controller 50 may receive information on print settings (printing condition) to be used when printing based on the original image data is to be executed. The print settings may include information on a printing resolution and mode information indicating selected one of the first printing mode and the second printing mode as a printing mode to be used.

The print settings may be included in the image data or set by the user before, when, or after the controller 50 receives the image data. In S2 the controller 50 displays a preview image PI on the display 14 based on this image data. For preparing the preview image data representing the preview image PI, the controller 50 may generate print data from the image data by reducing the image resolution of the image data to the printing resolution. After generating the print data, the controller 50 may generate the preview image data based on the print data. Alternatively, the controller 50 may generate the preview image data directly from the image data by reducing the image resolution of the image data to the printing resolution.

In S3 the controller 50 accepts, as the specified color, a color of the original pixel corresponding to the user-specified preview-image pixel. In other words, the controller 50 receives information on the preview-image pixel specified by the user among the plurality of preview-image pixels included in the preview image and acquires from the image data the specified color of the original pixel corresponding to the user-specified preview-image pixel. In S4 the controller 50 determines whether the printing mode is the second printing mode (high-quality printing mode). When the printing mode is not the second printing mode (S4: NO), in S5 the controller 50 acquires and sets the expanded region SR by referencing the table T2, for example. In other words, the controller 50 acquires, from the table T2, an expanded region SR associated with the printing resolution in which printing based on the original image data is to be executed, and sets the expanded region SR in the original image on the basis of the printing resolution in which printing based on the original image data is to be executed among the printing resolutions stored in the storage 53.

In S6 the controller 50 determines whether the number of original pixels included in the acquired expanded region SR is less than the predetermined number. In other words, in S6, the controller 50 calculates the number of all the original pixels included in the expanded region SR and determines whether the number of all the original pixels included in the expanded region SR is less than a prescribed value. When the number of all the original pixels in the expanded region SR is less than the predetermined number (S6: YES), in S7 the controller 50 generates a patch image for the color values of each original pixel in the expanded region SR. However, when the number of all the original pixels in the expanded region SR is not less than the predetermined number (S6: NO), in S8 the controller 50 extracts the color values for a plurality of original pixels having a predetermined high priority, and in S7 generates patch images only for those extracted color values. When generating the patch image in S7, the controller 50 extracts color values for original pixels in the expanded region SR from the original image data, and stores the extracted color values in the storage 53. In this case, the controller 50 may store the extracted color values in the form of the table T3 or T4. By using the extracted color values, in S7 the controller generates the image data for the patch chart image PA including the patch images based on the extracted color.

In other words, in S7 the controller 50 generates the print data for the patch chart image PA (patch chart print data) based on color values of at least two original pixels included in the expanded region SR. When the controller 50 has determined that the number of all the original pixels included in the expanded region SR is greater than or equal to the prescribed value, the controller 50 sets a priority of each of all the original pixels included in the expanded region SR. When the controller 50 has determined that the number of all the original pixels included in the expanded region SR is greater than or equal to the prescribed value, the controller 50 generates the patch chart print data so that the patch chart image PA includes one or more patch images corresponding to respective ones of one or more original pixels whose priorities are higher than a prescribed priority among all the original pixels included in the expanded region. Each of the one or more patch images has a color based on the corresponding one of the one or more original pixels. Here, a priority of each original pixel in the expanded region is based on a distance in a prescribed color space between a color of the each original pixel and an average of colors of two or more original pixels included in the expanded region.

After completing the process in S7, in S9 the controller 50 controls the ejection heads 20 to print a patch chart image PA with the generated patch images arranged therein on a print medium W on the basis of the patch chart image data. That is, the controller 50 controls the ejection heads 20 as the example of the print engine to print a patch chart image PA represented by the patch chart print data.

When the controller 50 determines in S4 that the printing mode is the second printing mode (S4: YES), in S9 the controller 50 controls the ejection heads 20 to print a patch chart image PA including the patch image for the specified color in the second patch area PR2 in the second printing mode.

In S10 the controller 50 receives measured colors in the patch chart image PA printed on the print medium W, and stores these colorimetric values in the storage 53 in association with the color values of the patch images. Here, the colors in the patch chart image PA are measured by using a colorimeter, such as a spectrophotometer. On the basis of these associations or correlations, in S11 the controller 50 creates a calibration profile for calibrating colors of an image to be printed to their target colors and controls the ejection heads 20 to print an image based on the original image data received in S1 on a print medium W on the basis of this calibration profile.

As described above, the printing device 1 sets a region having a plurality of original pixels that includes the corresponding original pixel DP as an expanded region SR on the basis of the printing resolution and generates patch images GP based on color values of original pixels in this expanded region SR. In this way, the printing device 1 can generate patch images GP not only for the color the user actually specified in the preview image PI but for the expanded region SR that includes this color. As a result, there is unlikely to be disparity between the position of the color the user actually specified in the preview image PI and the position of the color the user intended to specify. Therefore, the printing device 1 can properly calibrate the user-specified color and, hence, can suppress a decline in the accuracy of color calibration.

In the embodiment described above, the printing device 1 may calculate the averages of RGB values in the RGB color space for a plurality of original pixels in the expanded region SR and may generate a patch image GP for the color values having the averaged RGB values. Hence, the printing device 1 can calibrate colors more in line with the user's intention.

In the embodiment described above, the printing device 1 may calculate the averages of Lab values in the L*a*b* color space for a plurality of original pixels in the expanded region SR and may generate a patch image GP for the color values having the averaged Lab values. Hence, the printing device 1 can calibrate colors more in line with the user's intention.

In the embodiment described above, the printing device 1 sets an expanded region SR when the printing mode specified by the user is the first printing mode and does not set an expanded region SR when the printing mode is the second printing mode. Consequently, because a high-quality preview image PI is displayed when the printing mode is set to the second printing mode, which is the high-quality printing mode, the precision with which the user operates the cursor is likely to be relatively high. Therefore, because discrepancy is unlikely to occur between the position of the color actually specified by the user and the position of the color the user intended to specify, the process of setting an expanded region SR is of little importance in the second printing mode and can be omitted.

To easily determine whether to acquire an expanded region SR in the embodiment described above, the second printing mode may be a printing mode in which the printing resolution is 1200 dpi or higher, for example.

When the printing mode is the first printing mode in the embodiment described above, the printing device 1 sets the number of original pixels included in the expanded region SR. In this way, the printing device 1 can determine the number of patch images to be generated.

When the number of original pixels included in the expanded region SR is greater than or equal to a predetermined number in the embodiment described above, the printing device 1 generates patch images only for original pixels in the expanded region SR that have predetermined high priorities. That is, each predetermined high priority is higher than or equal to a predetermined priority ranking. In this way, the printing device 1 can avoid an excessive increase in the number of patch images, particularly when the printing mode uses a low-printing resolution.

The predetermined priority in the embodiment described above is set on the basis of the Euclidean distance within a predetermined color system (e.g., the RGB color space) between the color values of each original pixel in the expanded region SR and the average of the color values for each original pixel in the expanded region SR. Use of Euclidean distances in this way facilitates the printing device 1 in assigning priorities to the color values for which patch images should be generated.

When the number of original pixels included in the expanded region SR is less than the predetermined number in the embodiment described above, the printing device 1 generates patch images for all the original pixels in the expanded region SR. As a result, the printing device 1 can execute color calibration more closely in line with the user's intention.

In the embodiment described above, the printing device 1 can extract the number of original pixels included in the expanded region SR from the table T2. As a result, the printing device 1 can easily determine the number of patch images to be generated.

Variations

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

When setting the expanded region SR in the embodiment described above, the printing device 1 expands the selection range from the corresponding original pixel DP equally each way in the vertical direction D1 and each way in the left-right direction D2, but the present disclosure is not limited to this method. The printing device 1 may also expand the pixels in the selection range from the corresponding original pixel DP unequally in the vertical direction D1 and left-right direction D2. In other words, the expanded region SR may not have a square shape, but have a rectangular shape.

Further, while the preview image PI is displayed on the display 14 of the printing device 1 in the embodiment described above, the present disclosure is not limited to this method. For example, the preview image PI may be displayed on the display of a personal computer or the like that can communicate with the printing device 1 through cables or wirelessly.

In the embodiment described above, the printing device 1 calculates Euclidean distances based on the difference between the color values of each original pixel in the expanded region SR and the average color values of the plurality of original pixels in the expanded region SR, but the present disclosure is not limited to this method. The printing device 1 may calculate the Euclidean distances based on the difference between the color values of each original pixel in the expanded region SR and maximum or minimum color values among the plurality of original pixels in the expanded region SR. For example, the maximum color value of the color R may be a maximum color value of the color R among color values R in original pixels the expanded region SR, and the maximum color value of the color G may be a maximum color value of the color G among color values G in the pixels the expanded region SR. The maximum color valuer of the color B may be determined similarly. In this case, the maximum color values of the colors R, G, and B may be extracted from different original pixels in the expanded region SR. The minimum color values may be extracted in a manner similar to the maximum color values.

While an inkjet printer serves as an example of the printing device 1 in the embodiment described above, the printing device 1 may be another printer, such as a laser printer or a thermal printer. A laser printer is provided with a printing unit (a print engine). The printing unit of a direct tandem laser printer includes an image carrier such as a photosensitive drum or a photosensitive belt, a charging member that charges the image carrier through contact or non-contact, an exposure member that forms an electrostatic latent image on the charged image carrier using a laser semiconductor or the like (known as "exposure"), a toner cartridge or developing cartridge that supplies toner to the image carrier on which an electrostatic latent image has been formed, a transfer member such as a transfer roller or belt that transfers the developed toner image from the image carrier directly to a print medium, and a fixing member such as a fixing roller or belt that thermally fixes the toner transferred onto the print medium. The laser printer is not limited to a direct tandem laser printer but may be an intermediate transfer laser printer. The intermediate transfer laser printer first transfers the developed toner image from the image carrier onto an intermediate transfer belt before using the transfer member to transfer the toner image from the intermediate transfer belt onto the print medium. A thermal printer is also provided with a printing unit (print engine). The printing unit of a thermal printer includes a thermal head, and an ink ribbon. The thermal head contacts the ink ribbon and transfers ink in the ink ribbon onto a print medium by generating heat in selective heating elements.

In the embodiment described above, the controller 50 uses the arithmetic average when calculating averages of RGB values in the RGB color space for the nine acquired original pixels, but the present disclosure is not limited to this method. For example, the controller 50 may calculate weighted averages of RGB values in the RGB color space for the nine acquired original pixels.

In the embodiment, the printing device 1 is a serial head printer. However, the present disclosure is not limited to this. The printing device 1 may be a line head printer.

What is claimed is:

1. A printing device comprising:
a print head configured to perform printing based on image data on a printing medium, the image data representing an original image including a plurality of original pixels;
a storage storing information on printing resolutions in which the print head can perform printing; and
a controller configured to perform:
displaying a preview image based on the image data, the preview image including a plurality of preview-image pixels, each preview-image pixel corresponding to one of the plurality of original pixels in the original image and having a color based on at least a color of the corresponding original pixel;
receiving information on a preview-image pixel specified by a user among the plurality of preview-image pixels included in the preview image;
setting an expanded region in the original image on a basis of a printing resolution in which printing based on the image data is to be performed among the printing resolutions stored in the storage, the expanded region including original pixels of the plurality of original pixels, the original pixels in the expanded region including an original pixel corresponding to the preview-image pixel specified;
generating patch chart print data based on color values of at least two original pixels among the original pixels in the expanded region, the patch chart print data representing a patch chart image; and
controlling the print head to print the patch chart image represented by the patch chart print data based on the color values of the at least two original pixels among the original pixels in the expanded region.

2. The printing device according to claim 1, wherein the controller is further configured to perform:
acquiring the color values of the at least two original pixels among the original pixels in the expanded region; and
calculating an average value of the acquired color values in an RGB color space,
wherein the patch chart print data is generated on the basis of the average value.

3. The printing device according to claim 1, wherein the controller is further configured to perform:
acquiring the color values of the at least two original pixels among the original pixels in the expanded region; and
calculating an average value of the acquired color values in an L*a*b* color space, wherein the patch chart print data is generated on the basis of the average value.

4. The printing device according to claim 1, wherein the controller is further configured to execute:
receiving mode information specifying selected one of a first print mode and a second print mode, a quality of an image printed in the second print mode being higher than that in the first print mode,
wherein the controller performs the setting when the received mode information specifies the first print mode whereas the controller does not perform the setting when the received mode information specifies the second print mode.

5. The printing device according to claim 4, wherein in the first print mode printing is to be performed in a printing resolution lower than a predetermined resolution whereas in the second print mode printing is to be performed in a printing resolution higher than or equal to the predetermined resolution.

6. The printing device according to claim 1, wherein the controller is further configured to perform:
calculating a number of all the original pixels included in the expanded region.

7. The printing device according to claim 6, wherein the controller is further configured to perform:
determining whether the number calculated in the calculating is less than a predetermined number;
when the determining has determined that the number calculated is less than the predetermined number, setting a priority of each of all the original pixels included in the expanded region, and
wherein when the determining has determined that the number calculated is greater than or equal to the predetermined number, the controller generates the patch chart print data so that the patch chart image includes one or more patch images corresponding to respective ones of one or more original pixels corresponding to priorities higher than a predetermined priority among all the original pixels included in the expanded region, each of the one or more patch images having a color based on a corresponding one of the one or more original pixels.

8. The printing device according to claim 7, wherein a priority of each original pixel in the expanded region is based on a distance in a predetermined color space between a color of the each original pixel and an average of colors of two or more original pixels included in the expanded region.

9. The printing device according to claim 7, wherein when the determining has determined that the number calculated is less than the predetermined number, the controller generates the patch chart print data so that the patch chart image includes patch images corresponding to respective ones of all the original pixels included in the expanded region, each of the patch images having a color based on a corresponding one of all the original pixels included in the expanded region.

10. The printing device according to claim 6, wherein the storage stores a table associating each printing resolution with an expanded region,
wherein the controller is configured to perform:
acquiring, from the table, an expanded region associated with the printing resolution in which printing based on the image data is to be performed,
wherein in the setting the controller sets the acquired expanded region.

11. A printing method for controlling a printing device including: a print head configured to perform printing based on image data on a printing medium, the image data representing an original image including a plurality of original pixels; a storage storing information on printing resolutions in which the print head can perform printing, the printing method comprising:

displaying a preview image based on the image data, the preview image including a plurality of preview-image pixels, each preview-image pixel corresponding to one of the plurality of original pixels in the original image and having a color based on at least a color of the corresponding original pixel;

receiving information on a preview-image pixel specified by a user among the plurality of preview-image pixels included in the preview image;

setting an expanded region in the original image on a basis of a printing resolution in which printing based on the image data is to be performed among the printing resolutions stored in the storage, the expanded region including original pixels of the plurality of original pixels, the original pixels in the expanded region including an original pixel corresponding to the preview-image pixel specified;

generating patch chart print data based on color values of at least two original pixels among the original pixels in the expanded region, the patch chart print data representing a patch chart image; and controlling the print head to print the patch chart image represented by the patch chart print data based on the color values of the at least two original pixels among the original pixels in the expanded region.

12. A non-transitory computer readable storage medium storing a set of program instructions for controlling a printing device including: a print head configured to perform printing based on image data on a printing medium, the image data representing an original image including a plurality of original pixels; a storage storing information on printing resolutions in which the print head can perform printing, the set of program instructions comprising:

displaying a preview image based on the image data, the preview image including a plurality of preview-image pixels, each preview-image pixel corresponding to one of the plurality of original pixels in the original image and having a color based on at least a color of the corresponding original pixel;

receiving information on a preview-image pixel specified by a user among the plurality of preview-image pixels included in the preview image;

setting an expanded region in the original image on a basis of a printing resolution in which printing based on the image data is to be performed among the printing resolutions stored in the storage, the expanded region including original pixels of the plurality of original pixels, the original pixels in the expanded region including an original pixel corresponding to the preview-image pixel specified;

generating patch chart print data based on color values of at least two original pixels among the original pixels in the expanded region, the patch chart print data representing a patch chart image; and controlling the print head to print the patch chart image represented by the patch chart print data based on the color values of the at least two original pixels among the original pixels in the expanded region.

* * * * *